(12) United States Patent
Carlson

(10) Patent No.: US 6,907,062 B2
(45) Date of Patent: Jun. 14, 2005

(54) PRBS GENERATOR SELECTION IN MODEM COMMUNICATION

(75) Inventor: Arthur J. Carlson, Nevada City, CA (US)

(73) Assignee: Broadcom Corporation, Irvine, CA (US)

( * ) Notice: Subject to any disclaimer, the term of this patent is extended or adjusted under 35 U.S.C. 154(b) by 265 days.

(21) Appl. No.: 09/923,497

(22) Filed: Aug. 6, 2001

(65) Prior Publication Data

US 2003/0026399 A1 Feb. 6, 2003

(51) Int. Cl.$^7$ ................................................. H04B 1/38
(52) U.S. Cl. ........................ 375/222; 375/232; 379/340; 710/62
(58) Field of Search ............................. 710/62; 375/13, 375/222, 231; 714/728; 379/340; 719/722

(56) References Cited

U.S. PATENT DOCUMENTS

| | | | | |
|---|---|---|---|---|
| 5,034,906 A | * | 7/1991 | Chang et al. | ............... 708/250 |
| 5,283,831 A | * | 2/1994 | Cook et al. | ................... 380/48 |
| 5,285,474 A | * | 2/1994 | Chow et al. | .................. 375/13 |
| 5,461,640 A | * | 10/1995 | Gatherer | ...................... 375/231 |
| 5,761,216 A | * | 6/1998 | Sotome et al. | ............... 714/738 |
| 5,955,917 A | * | 9/1999 | Mandell et al. | ................. 330/2 |
| 6,044,276 A | * | 3/2000 | Goldberg et al. | ........... 455/503 |
| 6,201,870 B1 | * | 3/2001 | Medard et al. | ............... 380/46 |
| 6,211,919 B1 | * | 4/2001 | Zink et al. | ................... 348/473 |

OTHER PUBLICATIONS

Newton, Harry; Newton's Telecom Dictionary; 2002; CMP Books; 18th edition, p. 478.*
TMS320C30 Digital Signal Processor, Datasheet, Texas Instrument.*

* cited by examiner

*Primary Examiner*—Jeffrey Gaffin
*Assistant Examiner*—Alan Chen
(74) *Attorney, Agent, or Firm*—McAndrews, Held & Malloy, Ltd (57) ABSTRACT

The present invention relates to a system and method for selecting one of plurality of PRBS generators for use with a modem. The modem includes a measuring device adapted to measure an operating environment of the modem; and a storage device adapted to store a list of PRBS generator definitions. The modem selects one of a plurality of PRBS generators based on the measurement of the operating environment.

21 Claims, 6 Drawing Sheets

PRBS GENERATOR SELECTION IN MODEM COMMUNICATION

FEDERALLY SPONSORED RESEARCH OR DEVELOPMENT

Not Applicable

CROSS REFERENCE TO RELATED APPLICATIONS

Not Applicable

BACKGROUND OF THE INVENTION

One embodiment of the present invention relates to modems and more specifically to MEDLEY symbols in ADSL modems.

Pseudo-random bit sequence (hereinafter referred to as "PRBS") generators or scramblers have various uses in ADSL modems that conform to ITU-T Recommendations G.992.1 and G.992.2, both of which are hereby incorporated herein by reference. It should be appreciated that the term PRBS generator as used herein to identify either a pure PRBS generator or a scrambler based on a PRBS generator. Specifically, two different PRBS generators define the MEDLEY signal used for upstream and downstream training. A different PRBS sequence defines the form of the REVERB signal used in training while user data are scrambled during SHOWTIME using still another different PRBS generator.

Such a plurality of uses of PRBS generators in ADSL training demonstrates a need for means in an ADSL modem to select one of a set of different PRBS generators appropriate to observations made during training or to parameters that may not be known in advance.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One embodiment of the present invention relates to a system and method for selecting one of a plurality of PRBS generators for use with a modem.

Another embodiment of the present invention provides a modem adapted to select one of a plurality of PRBS generators. The modem includes a device adapted to measure an operating environment of the modem and memory adapted to store a list of PRBS generator definitions.

Yet another embodiment of the present invention provides a communication node adapted to establish a connection with a remote communication node. The node includes circuitry adapted to determine an operating environment of the communication node, and a management information node adapted to control the communication device according a list of stored PRBS generator definitions. In one embodiment, the list of PRBS generator definitions is stored on the management information node. In another embodiment, the circuitry includes a memory communicating with at least the management information node and adapted to store the list of PRBS generator definitions.

Yet another embodiment of the present invention comprises a method for selecting one of a plurality of PRBS generators. The method includes measuring an operating environment of a modem and selecting a stored PRBS generator from the plurality of generators based on the measured environment.

Still another embodiment of the invention comprises a method of communicating where a determination is made of the number of carriers to be used by a communication node. The number of carriers determined is then compared to a threshold. If the number of carriers determined is less than the threshold, then a first PRBS generator is selected. If the number of carriers determined is greater than the threshold, then a second PRBS generator is selected. The first PRBS generator may be longer than the second PRBS generator, for example.

Other aspects, advantages and novel features of the present invention, as well as details of an illustrated embodiment thereof, will be more fully understood from the following description and drawings, wherein like numerals refer to like parts.

DETAILED DESCRIPTION OF THE INVENTION

Figure 1:
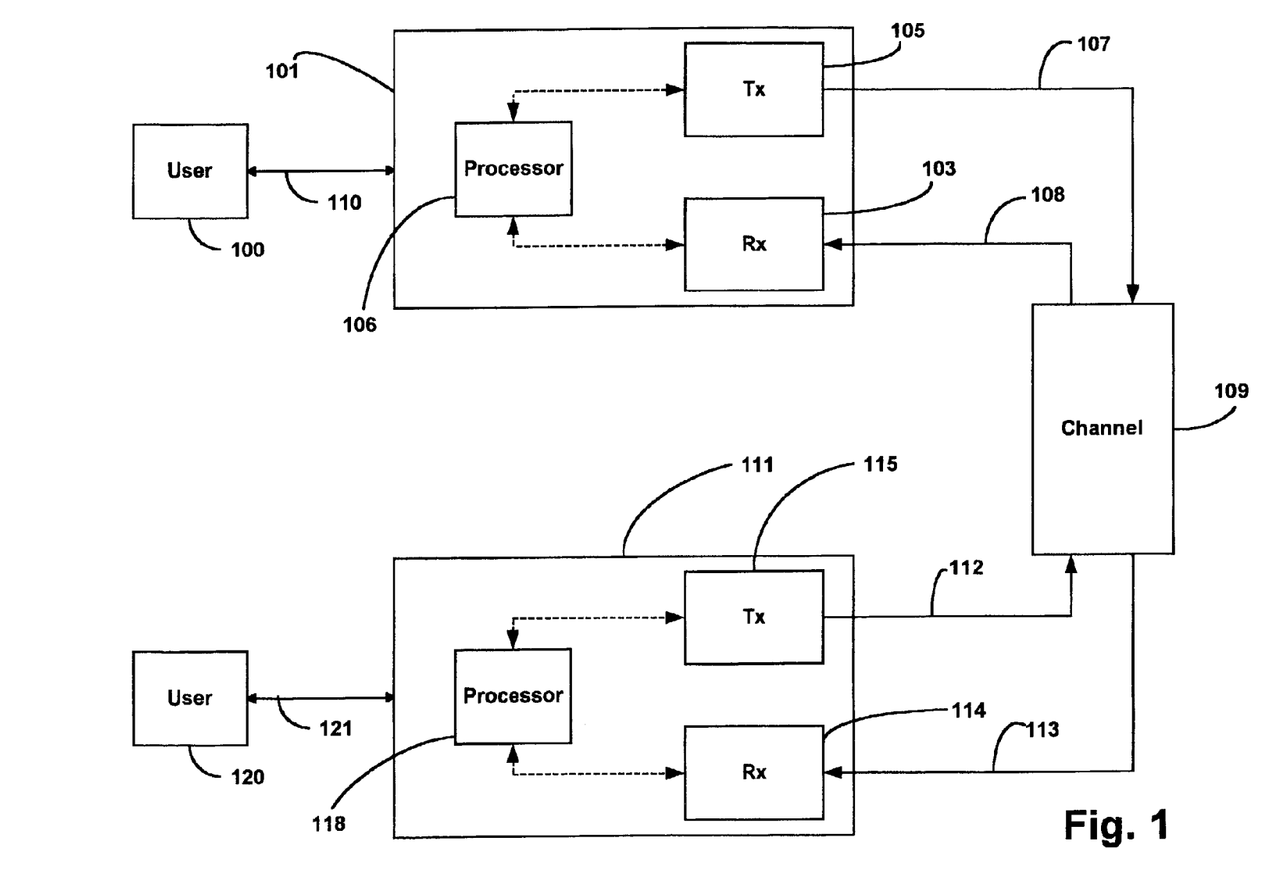
FIG. 1 illustrates a block diagram of a generic communication system that may be employed in connection with one embodiment of the present invention.

FIG. 1 illustrates a block diagram of a generic communication system that may be employed in connection with one embodiment of the present invention. The system comprises a first communication node 101, a second communication node 111, and a channel 109 that communicatively couples the nodes 101 and 111. In one embodiment, the communication nodes are ADSL modems for example, although any other type of transceiver device that transmits or receives data over a channel is contemplated.

The first communication node 101 comprises a transmitter 105, a receiver 103 and a processor 106. The processor 106 may comprise, for example, a microprocessor. The first communication node 101 is communicatively coupled to a user 100 (e.g., a computer) via communication link 110, and to the channel 109 via communication links 107 and 108.

Similarly, the second communication node 111 comprises a transmitter 115, a receiver 114 and a processor 118. The processor 118, like processor 106, may comprise, for example, a microprocessor. The second communication node 111 is likewise communicatively coupled to a user 120 (again a computer, for example) via communication link 121, and to the channel 109 via communication links 112 and 113.

During operation, the user 100 can communicate information to the user 120 using the first communication node 101, the channel 109 and the second communication node 111. Specifically, the user 100 communicates the information to the first communication node 101 via communication link 110. The information is transformed in the transmitter 105 to match the restrictions imposed by the channel 109.

The transmitter 105 then communicates the information to the channel 109 via communication link 107. The receiver 114 of the second communication node 111 next receives, via communication link 113, the information from the channel 109 and transforms it into a form usable by the user 120. Finally, the information is communicated from the second communication node 111 to the user 120 via the communication link 121. Communication of information from user 120 to user 100 may also be achieved in a similar manner. In either case, the information transmitted/received may also be processed using the processors 106/118.

One embodiment of the present invention provides a PRBS MEDLEY generator for use in ADSL modems, i.e., where ADSL modems are used, for example, as communication nodes 101 and 111 of the generic communication system. In one embodiment the ADSL modem selects one of a set of different PRBS generators appropriate to observations made during training or to parameters that may not be known in advance. An infinite number of PRBS generators are available for use in ADSL training. Specifications for some of these PRBS generators are provided in Table 1 below.

It should be appreciated that an important aspect of a PRBS generator is the initial state of the shift register. By specifying one of $2^N-1$ possible non-zero initial states, one of $2^N-1$ possible PRBS sequences can be selected for a given PRBS generator.

Further, a PRBS generator closely relates to a corresponding scrambler with its input clamped to one. Specifically, the output of such a scrambler when its initial state is not all ones corresponds exactly to the output of the corresponding PRBS generator when its initial state is not all zeros, except that zeros and ones in the PRBS generator output sequence are replaced, respectively, by ones and zeros in the scrambler output sequence.

In one embodiment, the MEDLEY signal is used in ADSL modems to estimate the channel unit-sample response and/or the signal-to-noise ratio (SNR) profile of the channel, so that the pair of modems may negotiate a set of operating parameters that will best utilize the capacity available on the channel. In order to accomplish this objective, the MEDLEY signal should be pseudo-random. That is, it appears to be random to the channel, but because the transmitter and the remote receiver share knowledge of the exact sequence used, the modems are able to remove the effect of the randomness in executing their signal processing algorithms.

In one embodiment, specific PRBS generators are employed in ADSL modems that conform to the incorporated ITU-T Recommendations G.992.1 and G.992.2. One such PRBS generator generates repeated bit patterns that repeat every 511 bits in the downstream (i.e. central office-to-remote, denoted D/S) direction; another generates repeated bit patterns that repeat every 63 bits in the upstream (i.e. remote-to-central office, denoted U/S) direction.

While the 511-bit period of the downstream PRBS generator is sufficiently random for purposes of modem training, the 63-bit period of the upstream PRBS generator is too short. The result is that the estimates of the channel unit-sample response and the channel SNR are insufficiently accurate to predict the performance of the upstream direction of data transmission during SHOWTIME.

Consequently, the modems must either add extra SNR margin to compensate for this missing channel knowledge or select a higher data rate that, necessarily, has lower SNR margin. It should be appreciated that either approach results in degraded performance when compared to the ideal situation.

More particularly, the SNR estimation phase of the G.992.1 and G.992.2 modems is performed during the R-MEDLEY and C-MEDLEY sequences, for the U/S and D/S channels, respectively. In one embodiment, the transmitter sends pseudo-random QPSK data patterns across the DMT tones, enabling the receiver to estimate the per-bin noise power. The per-bin noise power is generally made up of two main contributors, namely, a line noise term, including receiver and transmitter front-end noise and various cross-talk components, for example, plus an Inter-Symbol and Channel Interference (hereinafter referred to as "ISCI") term.

The ISCI term results from imperfect channel equalization, which causes the end-to-end channel impulse response (hereinafter referred to as "CIR") to be longer than the length of the Cyclic Prefix (hereinafter referred to as "CP"). The tails of the CIR outside the CP cause interference from the previous and next DMT symbols (ISI=Inter-Symbol Interference) and among DMT tones (ICI=Inter-Channel Interference).

It should be appreciated that the ISCI term is by nature a deterministic interference. For a given DMT symbol and tone, the ISCI term's instantaneous power depends on the particular QAM symbol sets that have been transmitted across the tones in current, previous and next DMT symbols. In one embodiment, it has been found that an ideal estimate of the average power of the ISCI term requires averaging the instantaneous power over all the possible combinations of the interfering QAM symbols. For example, if the ICI term dominates over the ISI, and 20 U/S bins are active, during R-MEDLEY one would need $4^{19} \approx 2.7 \times 10^{11}$ different DMT symbols. In practice, if a maximum error of 0.5 dB is acceptable, much shorter sequences are enough.

However, the sequence used for R-MEDLEY of the G.992.1 and G.992.2 modems uses only 63 different QPSK symbols (it is periodic, with a period of 63 DMT symbols). It has been found that this is insufficient and indeed may result in large estimation errors, up to 2~3 dB, for channels dominated by ISCI. If for MEDLEY the SNR is overestimated during SHOWTIME, it has been found that the bit error rate would degrade below the target value for a given margin. In particular, if the target margin is set below 2~3 dB, it has been found that the bit error rate in SHOWTIME would be higher than $10^{-7}$, an unacceptable situation.

It should be appreciated that, for G.lite.bis and G.dmt.bis modems, a PRBS generator having a period much longer than 63 DMT symbols for the sequence (i.e., around 500 symbols) should be used during the U/S SNR estimation phase initialization.

Figure 2:
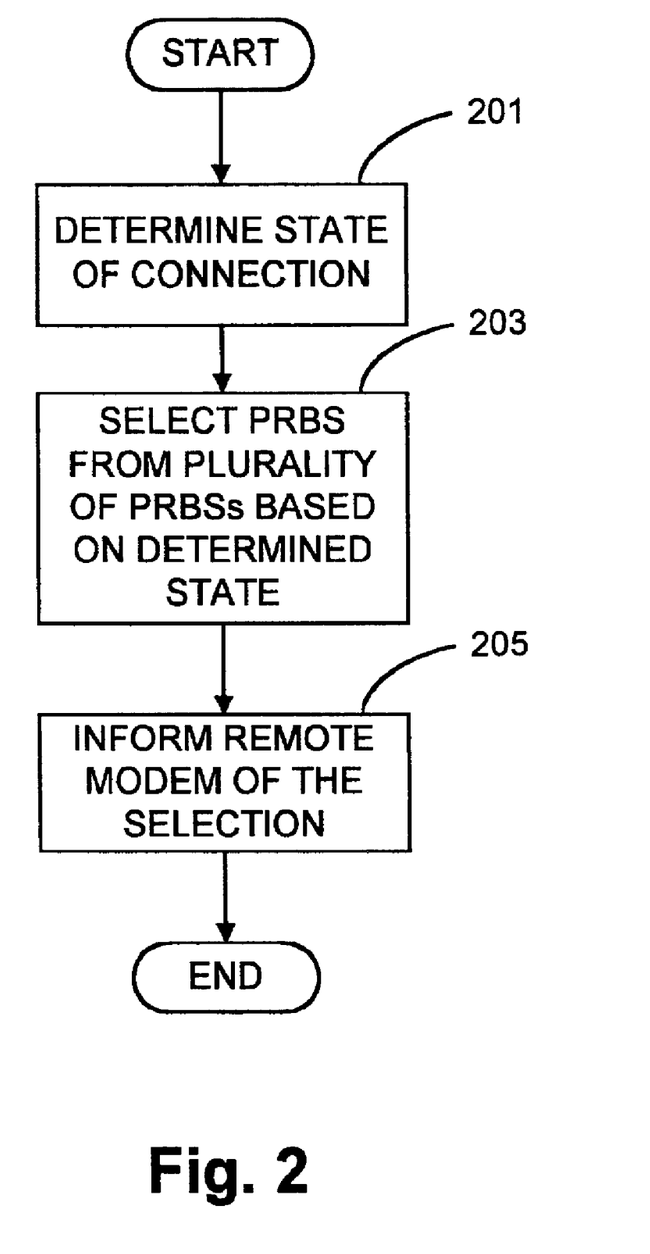
FIG. 2 illustrates a method of selecting a PRBS generator in accordance with one embodiment of the present invention.

One embodiment of the present invention includes selecting one of a family or a plurality of PRBS generators for use in ADSL training is illustrated in FIG. 2. ADSL modems operate by making extensive measurements on their operating environment during an elaborate training procedure that is executed when a pair of modems initially establishes a connection, as indicated by FIG. 2. According to current standards, the PRBS generator employed at each stage of training is defined a priori.

According to one embodiment of the present invention, a list of PRBS generator definitions is stored in the memory of the modem or in the management information base (MIB) that controls modem operation. Then, depending upon the results of measurements or observations made during training (block 201), the modem (or MIB) selects the generator most appropriate to the situation determined by the measurements or observations (as illustrated by block 203).

Once a specific PRBS is chosen, the modem informs the remote modem of its choice as indicated by block 205. One method for accomplishing this step is similar to those outlined in the commonly assigned in U.S. patent application Ser. No. 09/882,100 titled "Method of Intelligently Restricting Symbol Size in ADSL Modems," which application is hereby incorporated herein by reference.

A family of PRBS generators is specified that solves the problem outlined above. As discussed above, any PRBS generator with a period greater than about 500 achieves the desired performance. The following Table 1 provides a partial list of PRBS generators that meet the above criteria.

TABLE 1

PRBS Generators of length 9, 10, . . . , 23

| Basic PRBS | | | | Inverse PRBS | | | |
|---|---|---|---|---|---|---|---|
| 9  | 4 |   |   | 9  | 5  |    |    |
| 10 | 3 |   |   | 10 | 7  |    |    |
| 11 | 2 |   |   | 11 | 9  |    |    |
| 12 | 6 | 4 | 1 | 12 | 11 | 8  | 6  |
| 13 | 4 | 3 | 1 | 13 | 12 | 10 | 9  |
| 14 | 5 | 3 | 1 | 14 | 13 | 11 | 9  |
| 15 | 1 |   |   | 15 | 14 |    |    |
| 16 | 5 | 3 | 2 | 16 | 14 | 13 | 11 |
| 17 | 3 |   |   | 17 | 14 |    |    |
| 18 | 5 | 2 | 1 | 18 | 17 | 16 | 13 |
| 19 | 5 | 2 | 1 | 19 | 18 | 17 | 14 |
| 20 | 3 |   |   | 20 | 17 |    |    |
| 21 | 2 |   |   | 21 | 19 |    |    |
| 22 | 1 |   |   | 22 | 21 |    |    |
| 23 | 5 |   |   | 23 | 18 |    |    |

Figure 3:
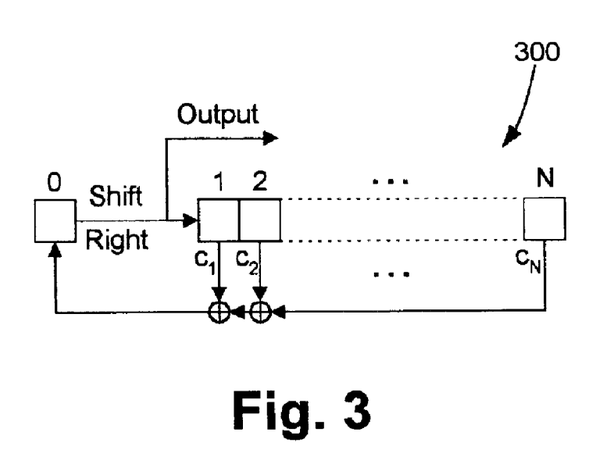
FIG. 3 illustrates a generic shift register based PRBS generator of the type employed in the present invention.

The rows in Table 1 provide a list of coefficients for shift register based PRBS generators, generally designated 300, similar to that illustrated in FIG. 3 for example. The set of coefficients defining such a PRBS generator has a general form as follows:

$$\{c_N, c_{N-1}, \ldots, c_1\},$$

and each row of Table 1 contains an entry i if $c_i=1$, and no entry if $c_i=0$ for the generator corresponding to that row. Such a PRBS generator of length N produces an output sequence that repeats with a period of $2^N-1$, so the repetition period exceeds 500 whenever N exceeds 9.

Figure 4:
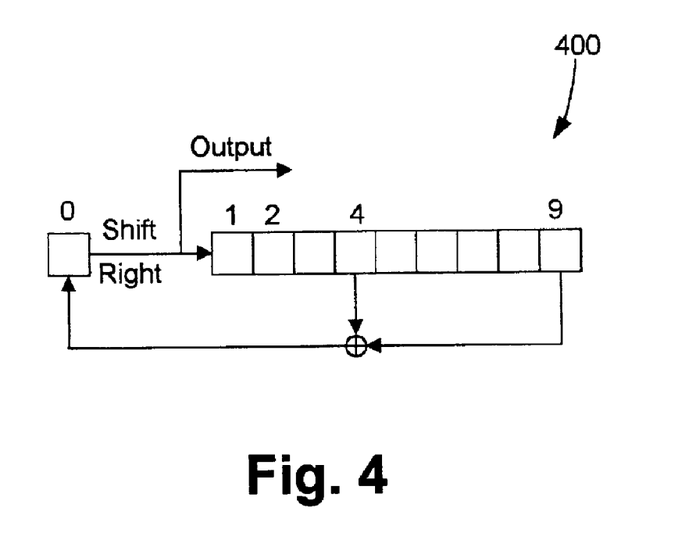
FIG. 4 illustrates another embodiment of a shift register based PRBS generator in accordance with one embodiment of the present invention.
Figure 5:
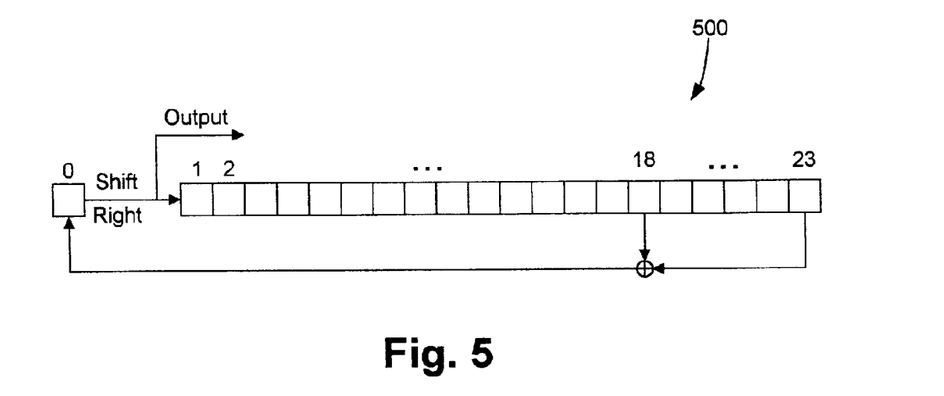
FIG. 5 illustrates yet another embodiment of a shift register based PRBS generator in accordance with one embodiment of the present invention.

FIG. 4 illustrates another embodiment of a PRBS generator, generally designated 400. In this embodiment, for example, the first row in Table 1 corresponds to a set of coefficients as follows:

$$\{c_9, c_8, \ldots, c_1\}$$

with $c_9=C_4=1$ and $c_i=0$ for other values of i based on the primitive polynomial, $1+x^{-4}+x^{-9}$. FIG. 5 illustrates a shift register based PRBS generator, generally designated 500, taken from the last row of Table 1, the (23, 18) PRBS generator, based on the primitive polynomial, $1+x^{-18}+x^{-23}$.

It should be appreciated that each PRBS generator has an inverse that is, itself, a PRBS generator; the inverse PRBS generators occupy the right side of Table 1.

Figure 6:
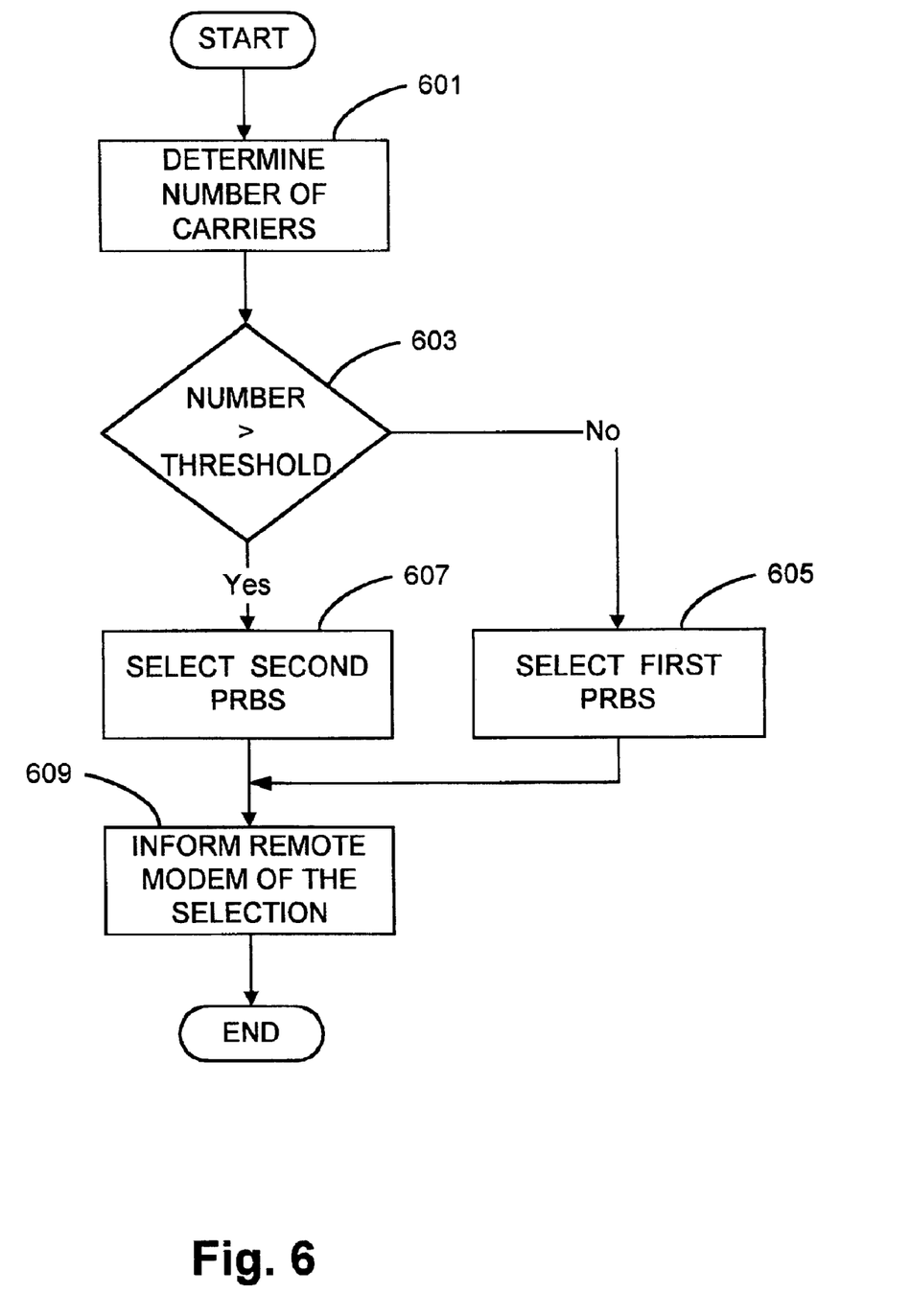
FIG. 6 is a flow diagram of one embodiment of the method of the present invention.

FIG. 6 is a flow diagram of one embodiment of the method of the present invention, in which a PRBS generator is selected based on the number of carriers used in communication. Specifically, the system makes, during training, a determination of the number of carriers to be used in communication (block 601). The determination may be made by one of the processors 106 and 118 of FIG. 1, for example. Once the number of carriers is determined, the number is compared to a threshold (block 603). If it is less than the threshold, a first PRBS generator is selected for use (block 605). If instead it is more than the threshold, a second PRBS generator is selected for use (block 607). In either case, the remote modem is informed of the selection (block 609).

Referring to FIG. 6, in general, the second PRBS generator is longer than the first PRBS generator. The first PRBS generator may be, for example, that shown in FIG. 4, which has a 511-bit period. The second PRBS generator may be, for example, that shown in FIG. 5, which has a period of approximately 8 million bits. The threshold used may be 32, for example. Of course any number of different PRBS generators and thresholds may be used and are contemplated by the present invention. In addition, multiple thresholding may be used, so that more than two PRBS generators may be available for selection given channel conditions.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A modem comprising:
   memory adapted to store a plurality of PRBS generator definitions;
   processing circuitry adapted to determine an operating environment of the modem, and to select one of the plurality of PRBS generator definitions based on the operating environment; and
   wherein an indication of the selected PRBS generator definition is transmitted to a remote modem.

2. The modem according to claim 1, wherein the processing circuitry includes the memory.

3. The modem according to claim 1, wherein the processing circuitry comprises measuring circuitry.

4. The modem according to claim 3, wherein the measuring circuitry comprises a processor.

5. The modem according to claim 1, wherein the operating environment of the modem comprises at least one channel condition.

6. The modem according to claim 1, wherein the operating environment of the modem comprises a preselected criterion.

7. A communication system comprising:
   a communication node having processing circuitry adapted to determine an operating environment of the communication node;
   a management information node adapted to control the communication node based on the operating environment and a plurality of stored PRBS generator definitions; and
   wherein an indication of a selected PRBS generator definition is transmitted to a remote modem.

8. The system according to claim 7, wherein the processing circuitry comprises memory for storing the plurality of PRBS generator definitions.

9. The system according to claim 7, wherein the processing circuitry comprises measuring circuitry.

10. The system according to claim 9, wherein the measuring circuitry comprises a processor.

11. The system according to claim 7, wherein the operating environment of the communication node comprises at least one channel connection.

12. The system according to claim 7, wherein the operating environment of the communication node comprises a preselected criterion.

13. The system of claim 7, wherein said plurality of PRBS generator definitions are stored on said management information node.

14. The system of claim 7, further comprising memory communicating with at least the management information node.

15. The system of claim 14, wherein said plurality of PRBS generator definitions are stored on said memory.

16. The system of claim 7, wherein said management information node comprises a MIB.

17. The system of claim 12 wherein the preselected criterion comprises a user selection.

18. A method of communication comprising:
   determining an operating environment of a communication node;
   selecting, based on the measured environment, a PRBS generator from a plurality of stored PRBS generators; and
   transmitting an indication of the selected PRBS generator to a remote modem.

19. The method as recited in claim 18, wherein determining an operating environment comprises measuring at least one channel condition.

20. The method as recited in claim 18, wherein determining an operating environment comprises obtaining a preselected criterion.

21. A method of communication comprising:
   determining a number of carriers to be used by a communication node; comparing the number of carriers determined to a threshold;
   selecting a first PRBS generator if the number of carriers determined is less than the threshold, and a second PRBS generator if the number of carriers determined is greater than the threshold; and
   transmitting an indication of the selected PRBS generator to a remote modem.

* * * * *